US009015446B2

(12) United States Patent
Cox et al.

(10) Patent No.: US 9,015,446 B2
(45) Date of Patent: Apr. 21, 2015

(54) CHIPSET SUPPORT FOR NON-UNIFORM MEMORY ACCESS AMONG HETEROGENEOUS PROCESSING UNITS

(75) Inventors: Michael Brian Cox, Menlo Park, CA (US); Brad W. Simeral, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 777 days.

(21) Appl. No.: 12/332,016

(22) Filed: Dec. 10, 2008

(65) Prior Publication Data

US 2010/0146222 A1 Jun. 10, 2010

(51) Int. Cl.
G06F 12/00 (2006.01)
G06F 12/02 (2006.01)
G06F 12/10 (2006.01)

(52) U.S. Cl.
CPC ........ *G06F 12/0284* (2013.01); *G06F 12/1081* (2013.01)

(58) Field of Classification Search
None
See application file for complete search history.

(56) References Cited

U.S. PATENT DOCUMENTS

| 5,682,512 | A  | * | 10/1997 | Tetrick | 711/202 |
| 5,893,144 | A  | * | 4/1999  | Wood et al. | 711/122 |
| 6,275,907 | B1 | * | 8/2001  | Baumgartner et al. | 711/143 |
| 6,418,514 | B1 | * | 7/2002  | Arimilli et al. | 711/133 |
| 6,438,660 | B1 |   | 8/2002  | Reams |  |
| 6,754,739 | B1 | * | 6/2004  | Kessler et al. | 710/52 |
| 7,596,654 | B1 | * | 9/2009  | Wong | 711/202 |
| 2003/0009640 | A1 | * | 1/2003 | Arimilli et al. | 711/147 |
| 2004/0019731 | A1 | * | 1/2004 | Brown | 710/310 |
| 2005/0060439 | A1 | * | 3/2005 | Duncan et al. | 710/15 |
| 2005/0120173 | A1 |   | 6/2005 | Minowa |  |
| 2008/0162873 | A1 | * | 7/2008 | Zimmer et al. | 712/22 |
| 2009/0182979 | A1 | * | 7/2009 | Farrell et al. | 712/200 |
| 2009/0198792 | A1 | * | 8/2009 | Wittenschlaeger | 709/215 |

FOREIGN PATENT DOCUMENTS

| JP | 06-187286 | 7/1994 |
| JP | 09-128346 | 5/1997 |
| JP | 11096127 A2 | 4/1999 |
| JP | 2000305841 A2 | 11/2000 |
| KR | 1020070052272 | 5/2007 |

OTHER PUBLICATIONS

Office Action, U.S. Appl. No. 12/332,009 dated Oct. 6, 2010.
KIPO Office Action, KR Appl. No. 10-2009-122330, mailed Mar. 15, 2011. (See summary from p. 1-3 of enclosure from Kim & Chang).
JP Office Action, Application No. 2009-280697 dated Aug. 3, 2011.
Notice of Reasons for Rejection dated Jul. 3, 2012 for Japanese Patent Application No. 2009-280696.

* cited by examiner

*Primary Examiner* — Daniel Bernard
(74) *Attorney, Agent, or Firm* — Artegis Law Group, LLP

(57) ABSTRACT

A method for providing a first processor access to a memory associated with a second processor. The method includes receiving a first address map from the first processor that includes an MMIO aperture for a NUMA device, receiving a second address map from a second processor that includes MMIO apertures for hardware devices that the second processor is configured to access, and generating a global address map by combining the first and second address maps. The method further includes receiving an access request transmitted from the first processor to the NUMA device, generating a memory access request based on the first access request and a translation table that maps a first address associated with the first access request into a second address associated with the memory associated with the second processor, and routing the memory access request to the memory based on the global address map.

20 Claims, 13 Drawing Sheets

CHIPSET SUPPORT FOR NON-UNIFORM MEMORY ACCESS AMONG HETEROGENEOUS PROCESSING UNITS

BACKGROUND OF THE INVENTION

1. Field of the Invention

The present invention relates generally to the field of computer architecture, more specifically, to chipset support for non-uniform memory access among heterogeneous processing units.

2. Description of the Related Art

As is well-known, a central processing unit (CPU) executing an operating system (OS) can access a local system memory and/or one or more hardware devices when performing input/output (I/O) operations. The I/O operations may be routed to and from the CPU through one or more bridges, including a memory bridge (e.g., "Northbridge" chip) and/or an I/O bridge (e.g., "Southbridge" chip). The one or more hardware devices may include memory modules, computer monitors, hard disk drives, and CD-ROM drives, Universal Serial Bus (USB) controllers, PCI Express (PCIe) controllers, among others. The hardware devices may be integrated hardware devices or peripheral hardware devices.

One problem with conventional computer architectures is they are designed with the underlying assumption that there is only a single CPU included in the computer system. Accordingly, when implementing a multi-processor system using conventional architecture schemes, it is not possible for each CPU to access the physical memory associated with the other CPUs.

Another problem with conventional architectures is that the chipsets and memory controllers are typically not designed for use in a multi-processor computer system where each processor can access the local memory of the other processor.

Some prior art computer architectures attempt to overcome these drawbacks by allowing two CPUs to coexist in the computer system. However, in these prior art computer architectures, each CPU must be aware of any other CPUs in the computer system and must be specially configured to operate in the multi-processor system. Additionally, in many prior art multi-CPU systems, the multiple processors are homogeneous, meaning that they are substantially the same and/or from the same vendor.

Accordingly, there remains a need in the art for an improved technique for allowing multiple heterogeneous processing units to access the physical memory associated with other processing units in the same system.

SUMMARY OF THE INVENTION

Embodiments of the invention provide a method for providing a first processor access to a physical memory associated with a second processor included in a computer system. The method includes receiving a first address map from the first processor that includes a memory-mapped input/output (I/O) aperture for a non-uniform memory access (NUMA) device that the first processor is configured to access, receiving a second address map from the second processor that includes memory-mapped I/O apertures for a set of hardware devices that the second processor is configured to access, and generating a global address map by combining the first address map and the second address map. The method further includes receiving a first access request transmitted from the first processor to the NUMA device, whereby the first processor requests access to the physical memory associated with the second processor, generating a memory access request based on the first access request and a translation table for translating memory mapped I/O addresses into physical addresses associated with a physical memory, where the translation table maps a first address associated with the first access request into a second address associated with the physical memory associated with the second processor, and routing the memory access request to the physical memory based on the global address map.

Other embodiments of the invention include a computer-readable medium storing instructions that, when executed by a processor, configure a computer system to implement one or more variations of the above method, as well as a device controller configured to implement one or more variations of the above method.

One advantage of the disclosed method is that heterogeneous processors included in multi-processor system can access any physical memory included within the computer system, without modifying the processors, the operating systems, or the memory controllers.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1A:
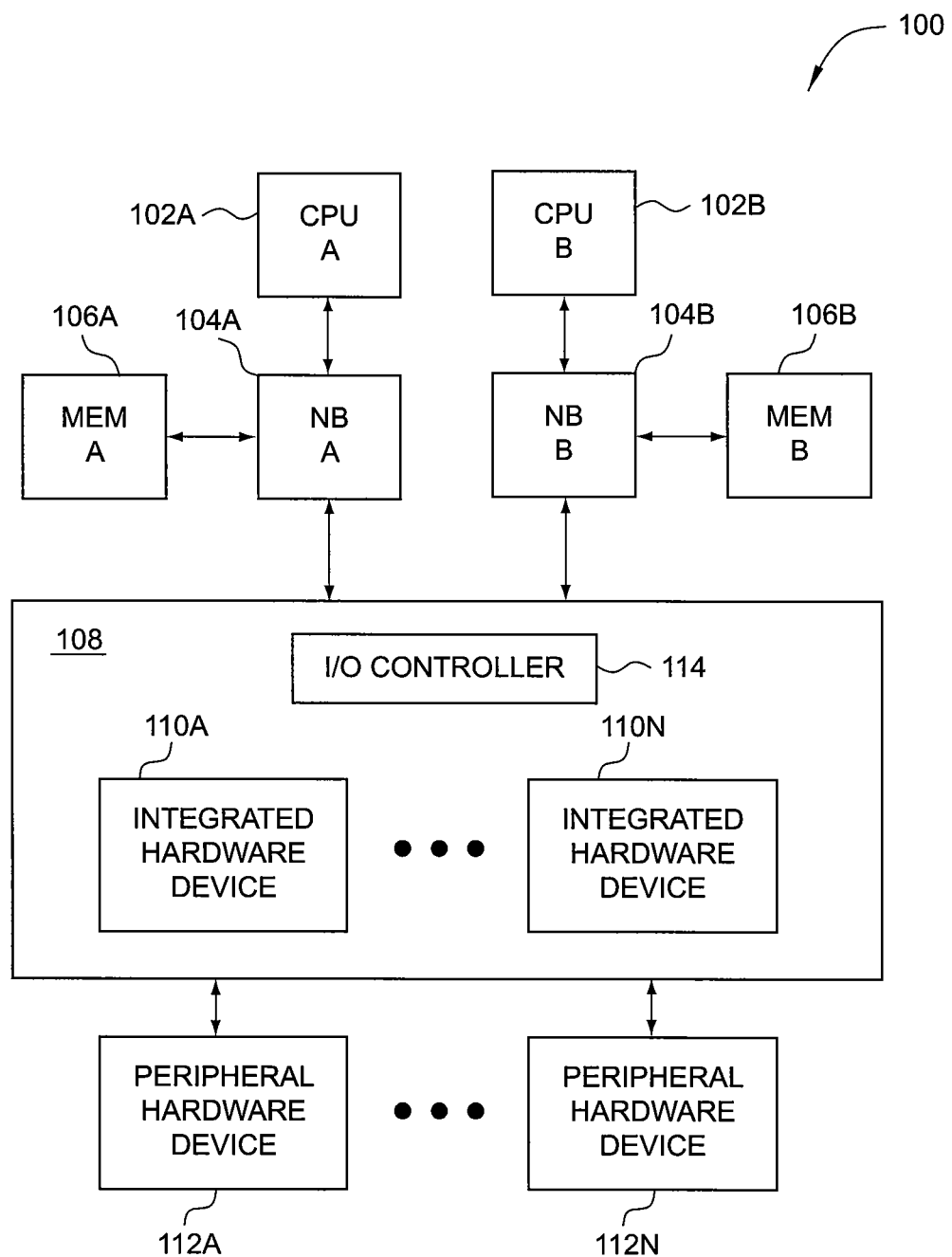
FIGS. 1A-1D are conceptual diagram of computer systems configured to provide chipset support for cache-coherent and/or cache-noncoherent Non-Uniform Memory Access (NUMA) among heterogeneous processing units, according to various embodiments of the invention.

FIG. 1A is a conceptual diagram of a computer system 100 configured to provide chipset support for cache-coherent and/or cache-noncoherent Non-Uniform Memory Access (NUMA) among heterogeneous processing units, according to one embodiment of the invention. As shown, the computer system 100 includes processor 102A, processor 102B, memory bridge 104A, memory bridge 104B, memory 106A, memory 106B, and input/output (I/O) management module 108. The I/O management module 108 is coupled to peripheral hardware devices 112A-412N and includes an I/O controller 114 and integrated hardware devices 90A-420N.

The processor 102A, the processor 102B, the peripheral hardware devices 112A-412N, and the integrated hardware devices 110A-410N may be associated with one or more drivers stored in memory 106A and/or memory 106B. The drivers are software programs that, when executed by either the processor 102A and/or the processor 102B translate program instructions into different types of machine code. For example, the processor 102A could execute the driver associated with the processor 102A to translate program instructions into machine code native to the processor 102A.

Processor 102A and processor 102B may each be a central processing unit (CPU) configured to execute software programs to implement the various functions of the computer system 100. These software programs include one or more operating systems executing each of the processors 102A, 102B. The operating systems provide a user with different computing environments that may be used to execute applications associated with each computing environment. For example, a first operating system executed by processor 102A could be Windows® XP, which is an operating system that would provide the user with access to programs such as Microsoft® Office, while a second operating system executed by processor 102B could be a UNIX-based operating system that functions as a file transfer protocol (FTP) server.

The processor 102A is coupled to the memory bridge 104A and the processor 102B is coupled to the memory bridge 104B. In one embodiment, the memory bridges 104A, 104B each comprise a Northbridge chip. The memory bridge 104A is coupled to the memory 106A and the memory bridge 104B is coupled to the memory 106B. The processor 102A may read data from and write data to the memory 106A through the memory bridge 104A, and the processor 102B may read data from and write data to the memory 106B through the memory bridge 104B. This data may include software programs as well as other types of data.

Each memory bridge 104A, 104B is coupled to the I/O management module 108. The I/O management module 108 allows the peripheral hardware devices 112A-412N and the integrated hardware devices 110A-410N to be accessible to the processors 102A, 102B and to the software programs executed by these processing units. In one embodiment, the I/O management module 108, also referred to herein as the "chipset" 108, comprises a Southbridge chip. The peripheral hardware devices 112A-412N may be coupled to the I/O management module 108 using a connector such as, for example, a universal serial bus (USB) connector or a firewire connector. The peripheral devices 112A-412N may include a keyboard, a mouse, a printer, a scanner, a disk drive, a flash drive, a tape drive, a microphone, a speaker, a computer monitor, a digital video camera, or another computer system, among others.

The integrated hardware devices 110A-410N are located on the same chip (or chips) that stores the I/O management module 108 and provides various system functions to the computer system 100. The integrated hardware devices 110A-410N include a real-time clock, an advanced power management (APM) module, a peripheral component interface (PCI) bus, a PCI Express (PCIe) bus, a direct memory access (DMA) controller, an interrupt controller, a baseboard management controller, a peripheral advanced technology attachment (PATA) controller, a serial advanced technology attachment (SATA) controller, or a nonvolatile basic input/output system (BIOS) memory, among others.

The peripheral hardware devices 112A-412N and the integrated hardware devices 110A-410N, referred to collectively herein as "hardware devices," are accessible to the processors 102A, 102B via the memory bridges 104A, 104B, respectively, and the I/O management module 108. According to various embodiments of the invention, one or more of the hardware devices comprises a Non-Uniform Memory Access (NUMA) device, which is accessible by one or more CPUs and provides the one or more CPUs coherent and/or non-coherent access to the physical memory 106A, 106B associated with another CPU.

The I/O controller 114 is a functional unit configured to arbitrate and route access requests between the processors 102A, 102B and the hardware devices. The I/O controller 114 may be implemented as hardware, as software, or as a combination of hardware and software. For example, the I/O controller 114 can be implemented as firmware included in the I/O management module 108 executed by a general purpose processor.

The I/O controller 114 in configured to intercept access requests transmitted by the processors 102A, 102B (also referred to herein as "downstream transactions") and functions to avoid conflicts between the multiple processors 102A, 102B that access to the hardware devices and routes the access requests to the appropriate hardware device. The I/O controller 114 also intercepts return transactions and interrupts transmitted by the hardware devices (also referred to herein as "upstream transactions") and routes these transactions to the corresponding processor and/or physical memory.

Embodiments of the invention provide chipset support for allowing each processor 102A, 102B in the computer system 100 to use and access any hardware device and/or memory 106A, 106B included in the computer system 100, without processor or operating system modification. Embodiments of the invention specifically provide support for routing transactions between each processor 102A, 102B and the hardware devices, for routing transactions between the hardware devices and memories 106A, 106B, for binding the hardware devices to each processor 102A, 102B, for migrating hardware devices between the processors 102A, 102B, and for routing peer-to-peer transactions between hardware devices. Additionally, embodiments of the invention do not rely on modification to any particular hardware device controller. Instead, the embodiments of the invention rely on modifications within the chipset 108.

The computer system 100 illustrated in FIG. 1A includes two processors 102A, 102B and two memory bridges 104A, 104B. However, embodiments of the invention equally apply to a system architecture having any number of processors and memory bridges. Additionally, each processor 102A, 102B may be, but is not required to be, heterogeneous, which includes processors from different vendors, with potentially different instruction sets, executing potentially different operating systems, and with any number of other differences.

Furthermore, additional embodiments of computer system 100 include components such as a network adapter, system disk, add-in cards, display device, parallel processing subsystem that includes a parallel processing unit (PPU), such as a graphics processing unit (GPU), among others, none of which are shown in FIG. 1A to avoid obscuring embodiments of the invention.

Persons skilled in the art will understand that the architecture described in FIG. 1A in no way limits the scope of the present invention and that the techniques taught herein may be implemented on any properly configured processing unit(s), including, without limitation, one or more CPUs, one or more multi-core CPUs, one or more PPUs, one or more programmable and/or not programmable GPUs, one or more special purpose processing units, or the like, without departing the scope of the present invention.

Figure 1B:
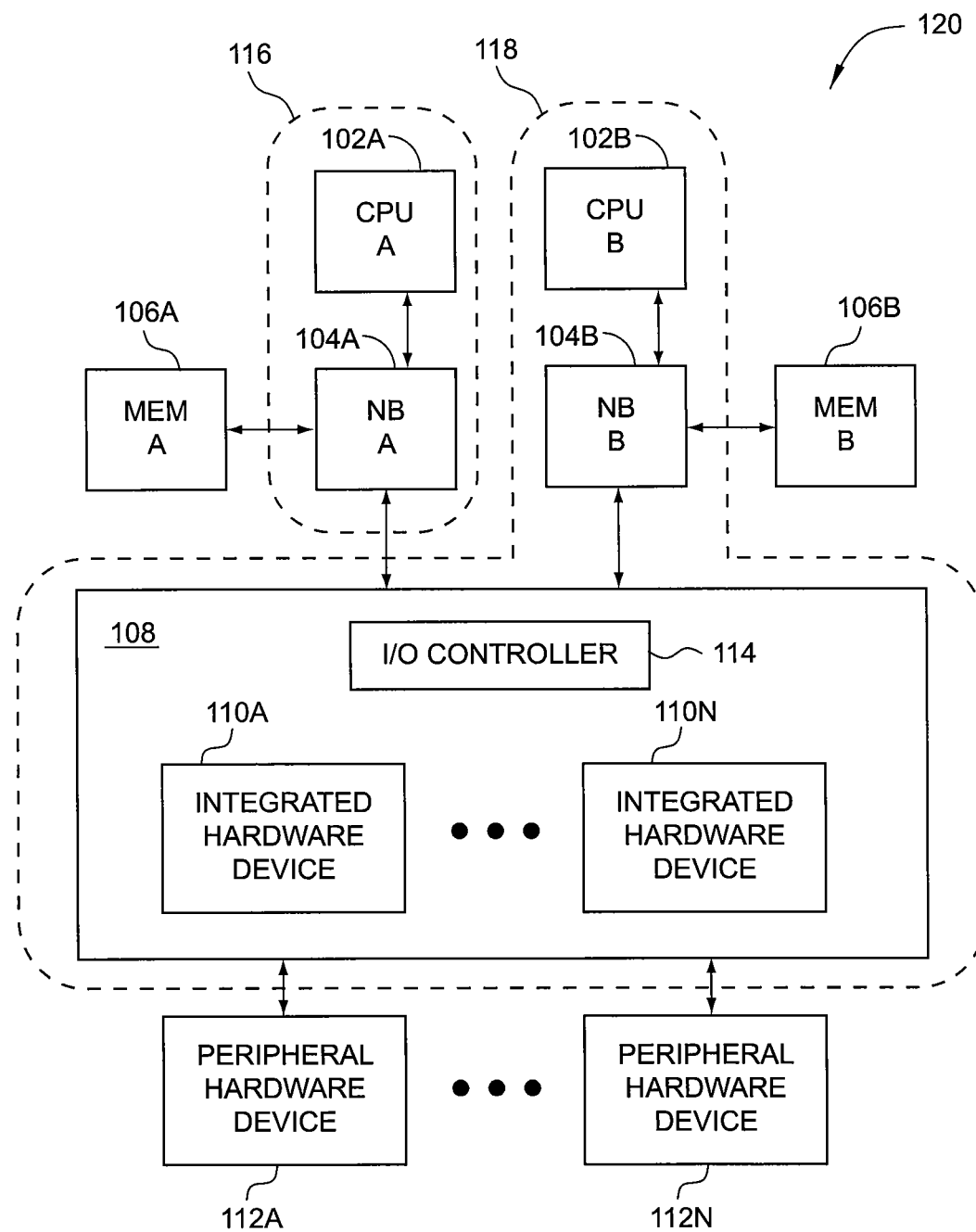
Figure 1C:
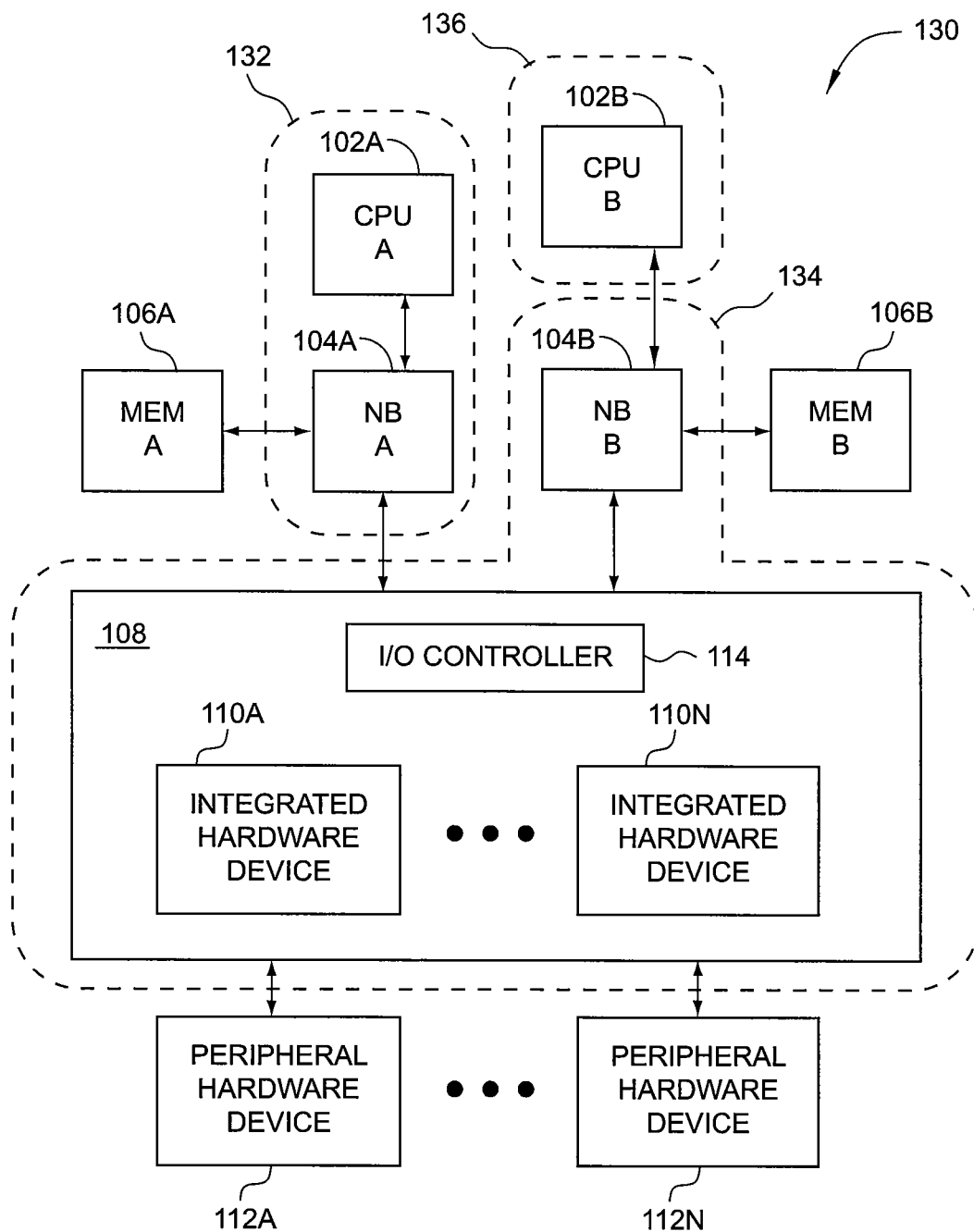
Figure 1D:
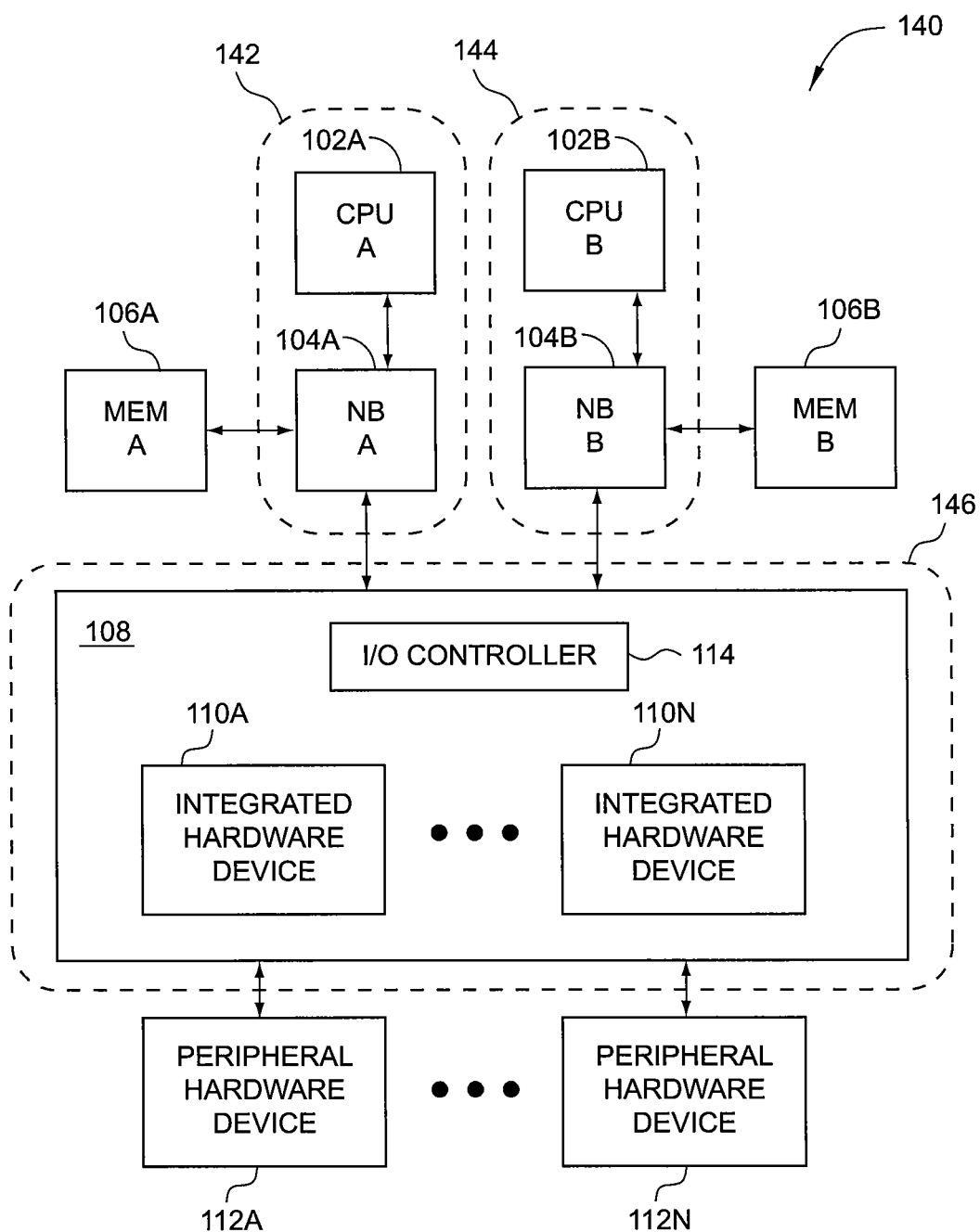

The computer system 100 architecture illustrated in FIG. 1A, also, may be embodied as any number of chips, as described in greater detail in FIGS. 1B-1D. FIG. 1B is a conceptual diagram of a computer system 120 configured to provide chipset support for cache-coherent and/or cache-noncoherent NUMA among heterogeneous processing units, according to one embodiment of the invention. The computer system 120 may include the same components as the computer system 100 illustrated in FIG. 1A. As shown, the processor 102A and the memory bridge 104A are integrated on a first chip 116, and the processor 102B, the memory bridge 104B, and the I/O management module 108 are integrated on a second chip 118. The second chip 118 supports an external connection to the first chip 116. In one embodiment, second chip 118 comprises a System-On-A-Chip with full functionality that can be upgraded to include an additional external processor or a memory bridge (i.e., upgraded to connect to the first chip 116).

FIG. 1C is a conceptual diagram of a computer system 130 configured to provide chipset support for cache-coherent and/or cache-noncoherent NUMA among heterogeneous processing units, according to one embodiment of the invention. Again, the computer system 130 may include the same components as the computer system 100 illustrated in FIG. 1A. As shown, the processor 102A and the memory bridge 104A are integrated on a first chip 132, the memory bridge 104B and the I/O management module 108 are integrated on a second chip 134, and the processor 102B is integrated on a third chip 136. In one embodiment, the first chip 132 is provided by a first vendor that supplies chips that include a processor and a corresponding memory bridge, and the second chip 134 and/or the third chip 136 are provided by a second vendor.

FIG. 1D is a conceptual diagram of a computer system 140 configured to provide chipset support for cache-coherent and/or cache-noncoherent NUMA among heterogeneous processing units, according to one embodiment of the invention. Again, the computer system 140 may include the same components as the computer system 100 illustrated in FIG. 1A. As shown, the processor 102A and the memory bridge 104A are integrated on a first chip 142, the processor 102B and the memory bridge 104B are integrated on a second chip 144, and the I/O management module 108 is integrated on a third chip 146.

As should be apparent to those having ordinary skill in the art, other combinations of chips, other than those illustrated in FIGS. 1B-1D, are within the scope of embodiments of the invention. In various embodiments, the connection between any memory bridge and the chipset may be a PCI Express (PCIe) interface, an interface involving PCIe in combination with Desktop Management Interface (DMI) standards, a HyperTransport (HT) interface, a proprietary and/or internal chipset interface, or any other Southbridge to Northbridge connection interface. Additionally, in various embodiments, the connection between a particular processor and the corresponding memory bridge is specific to the processor vendor. In still further embodiments, each processor may be executing any software, including different operating systems, and each processor may be configured with its own address map as if that processor is the only processor in the computer system. For example, each processor and/or operating system may expect to view the hardware devices as though those hardware devices were dedicated solely to that particular processor and/or operating system. Again, embodiments of the invention provide support for hardware devices and/or memories 106A, 106B to be accessed by multiple processors, even when these hardware devices and/or memories 106A, 106B are not specifically designed to work with a multi-processor and/or heterogeneous-processor computing environment.

Figure 2:
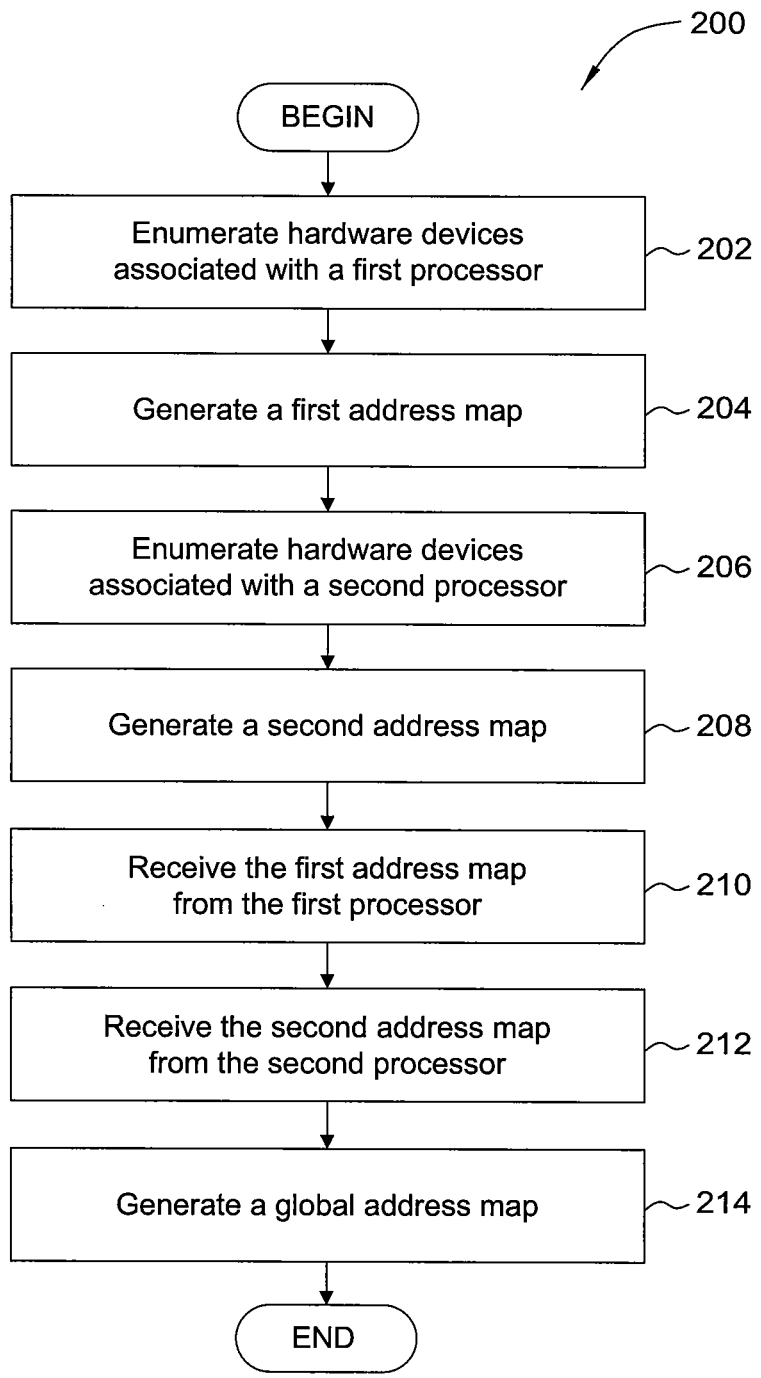
FIG. 2 is a flow diagram of method steps for generating a global address map, according to one embodiment of the invention.

FIG. 2 is a flow diagram of method steps for generating a global address map, according to one embodiment of the invention. Persons skilled in the art will understand that, even though the method 200 is described in conjunction with the systems of FIGS. 1A-1D, any system configured to perform the method steps, in any order, is within the scope of embodiments of the invention.

As shown, the method 200 begins at step 202, where the hardware devices associated with a first processor (e.g., processor 102A) are enumerated. In one embodiment, enumerating the hardware devices is performed, at least in part, by firmware code (e.g., BIOS and/or other system software) executed by the first processor. In an alternative embodiment, the I/O controller 114 enumerates the hardware devices associated with the first processor. One of the enumerated hardware devices associated with the first processor may be a "NUMA device," described in greater detail below, which provides the first processor access to the physical memory associated with a different processor.

At step 204, a first address map is generated that provides a memory space for the first processor. Memory addresses in the first address map may refer either to physical memory or to memory-mapped I/O apertures for the enumerated hardware devices that the first processor is configured to access. In one embodiment, an MMIO aperture is generated that allows the first processor access the NUMA device.

At step 206, the hardware devices associated with a second processor (e.g., processor 102B) are enumerated. Step 206 may be performed in a substantially similar manner to the step 202. However, the enumerated devices associated with the first processor may be different that the enumerated devices associated with the second processor. For example, a second NUMA device may be enumerated to be associated with the second processor, where the second NUMA device allows the second processor to access the physical memory associated with the first processor. In another example, a single NUMA device is enumerated that allows each processor to access the physical memory associated with the other processor. In one embodiment, all of the hardware devices included in the computer system are enumerated by each processor. In an alternative embodiment, each hardware device is statically bound to only one processor during enumeration so that only that processor can access that particular hardware device. In further embodiments, some of the hardware devices are enumerated by both processors and other hardware devices are enumerated by only one of the processors.

At step 208, a second address map is generated that provides a memory space for the second processor. Similar to the first address map generated at step 204, memory addresses in the second address map may refer either to physical memory or to memory-mapped I/O apertures for the enumerated hardware devices that the second processor is configured to access. However, since the list of enumerated devices that the second processor is able to access may be different than the list of enumerated devices that the first processor is able to access, the second address map may be different than the first address map. Additionally, even when the list of enumerated devices and the size of each memory mapped aperture is the same for both processors, the processor and/or operating system executed by each processor may implement a different scheme when generating the address map. Accordingly, even in this scenario, the first and second address maps may be different.

At step 210, the I/O management module 108 receives the first address map from the first processor. As described above, the first address map defines a "view" of the first processor relative to the hardware devices in the system. In order for transactions to be routed between the first processor and hardware devices, the I/O management module 108 receives and stores the first address map.

At step 212, the I/O management module 108 receives the second address map from the second processor. Step 212 is substantially similar to step 210, described above.

At step 214, the I/O management module 108 generates a global address map by combining the first address map and the second address map. As described herein, the global address map allows transactions originating from each processor to be routed to the appropriate hardware device, including NUMA devices, and allows transactions originating from hardware devices to be routed to the appropriate processor and/or physical memory. In one embodiment, the addresses included in the global address map include the addresses in the first address map pre-pended with a "0" and the addresses in the second address map pre-pended with "1". In this manner, the global address space includes one additional bit relative the address space of first address map and/or the second address map. In alternative embodiments, where more than two processors are included in the computer system, additional pre-pended bits may be included to disambiguate between the processors. In further alternative embodiments, the first address map and the second address map are combined into the global address map using more complicated techniques, independent and distinct from pre-pending a bit to the address maps.

Figure 3:
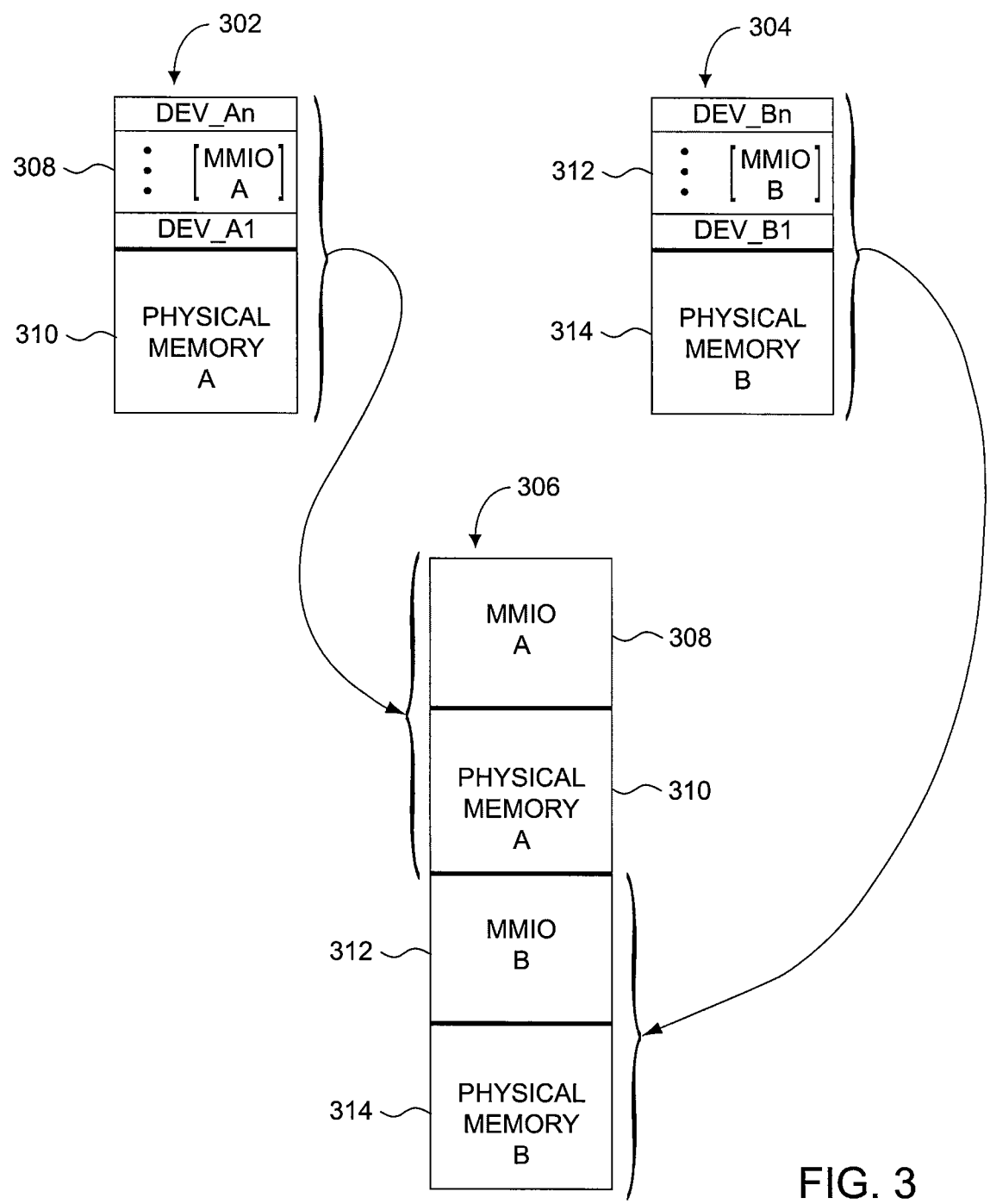
FIG. 3 is a conceptual diagram that illustrates a global address map, according to one embodiment of the invention.

FIG. 3 is a conceptual diagram that illustrates a global address map 306, according to one embodiment of the invention. As shown, a first address map 302, which includes a first MMIO portion 308 and a first physical memory portion 310, is combined with a second address map 304, which includes a second MMIO portion 312 and a second physical memory portion 314, to generate the global address map 306.

The first MMIO portion 308 includes one or more "apertures" (e.g., Dev_A1 through Dev_An) that provide MMIO access to hardware devices accessible by the first processor. As is known, a first aperture associated with a first hardware device may be of a different size than a second aperture associated with a second hardware device. According to one embodiment of the invention, the first processor is configured to access a first NUMA device, and an aperture associated with the first NUMA device is included within the first MMIO portion 308. The first physical memory portion 310 provides a mapping into the memory 106A associated with the first processor 102A. In one embodiment, the mapping included in the first physical memory portion 310 comprises a simple pass-through.

Similarly, the second MMIO portion 312 includes one or more apertures (e.g., Dev_B1 through Dev_Bn) that provide MMIO access to hardware devices accessible by the second processor. According to one embodiment of the invention, the second processor is configured to access the first NUMA device, and an aperture associated with the first NUMA device is included within the second MMIO portion 312. In another embodiment, the second processor is configured to access a second NUMA device.

The method and system described in FIGS. 2 and 3 relate specifically to memory space address maps. Additionally, a similar method and system may be implemented to generate "configuration space" address maps for the first processor and the second processor that are combined into a global configuration space map. As is known, configuration space addresses are of the form <bus, device, function>, and are the addresses used for configuration cycles between a processor and a hardware device and for routing certain PCIe transaction packets.

Figure 4:
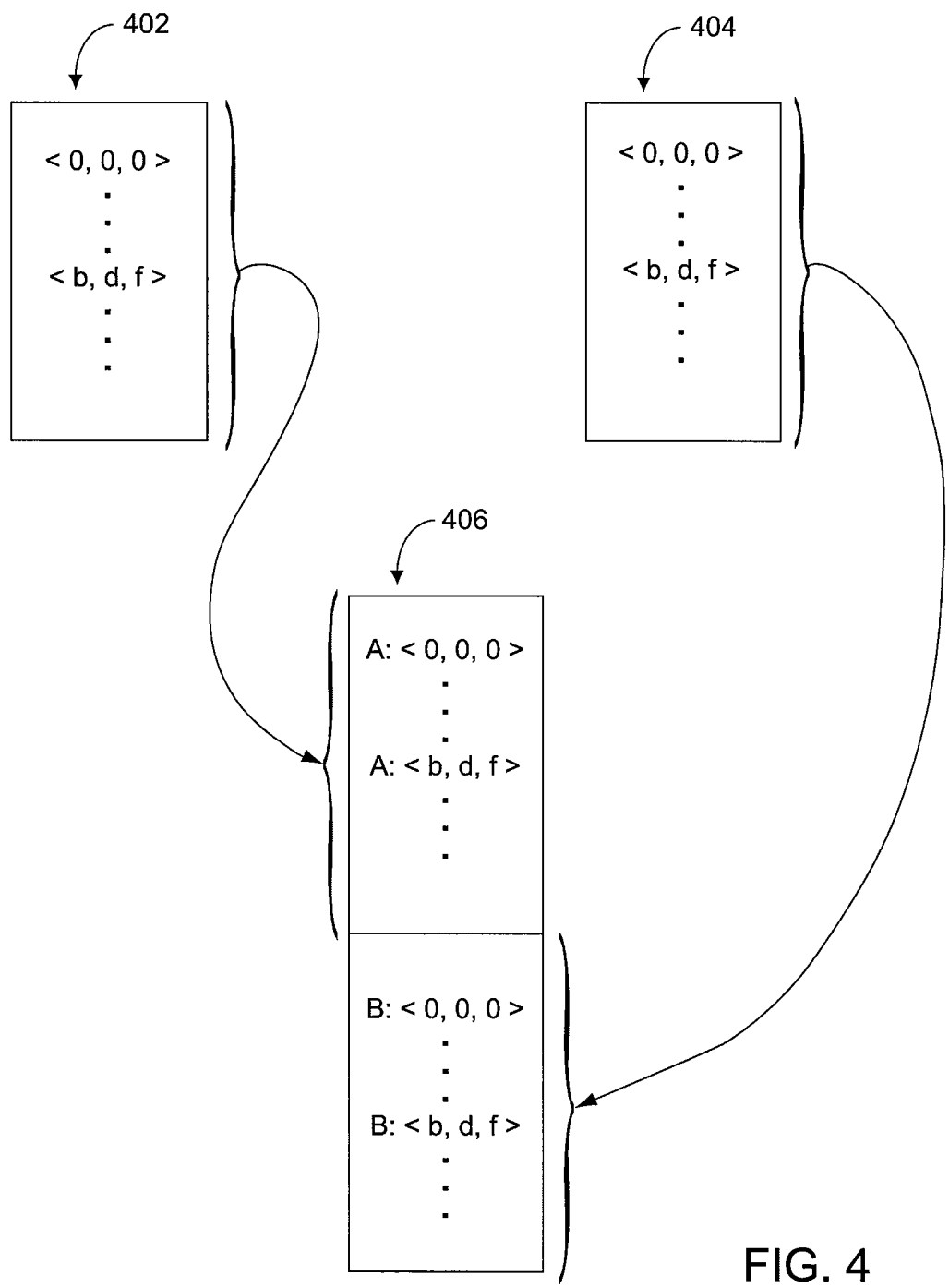
FIG. 4 is a conceptual diagram that illustrates a global configuration space map, according to one embodiment of the invention.

FIG. 4 is a conceptual diagram that illustrates a global configuration space map 406, according to one embodiment of the invention. As shown, a first configuration space address map 402 associated with a first processor (e.g., processor 102A) can be combined with a second configuration space address map 404 associated with a second processor (e.g., processor 102B) to generate the global configuration space address map 406.

Figure 5:
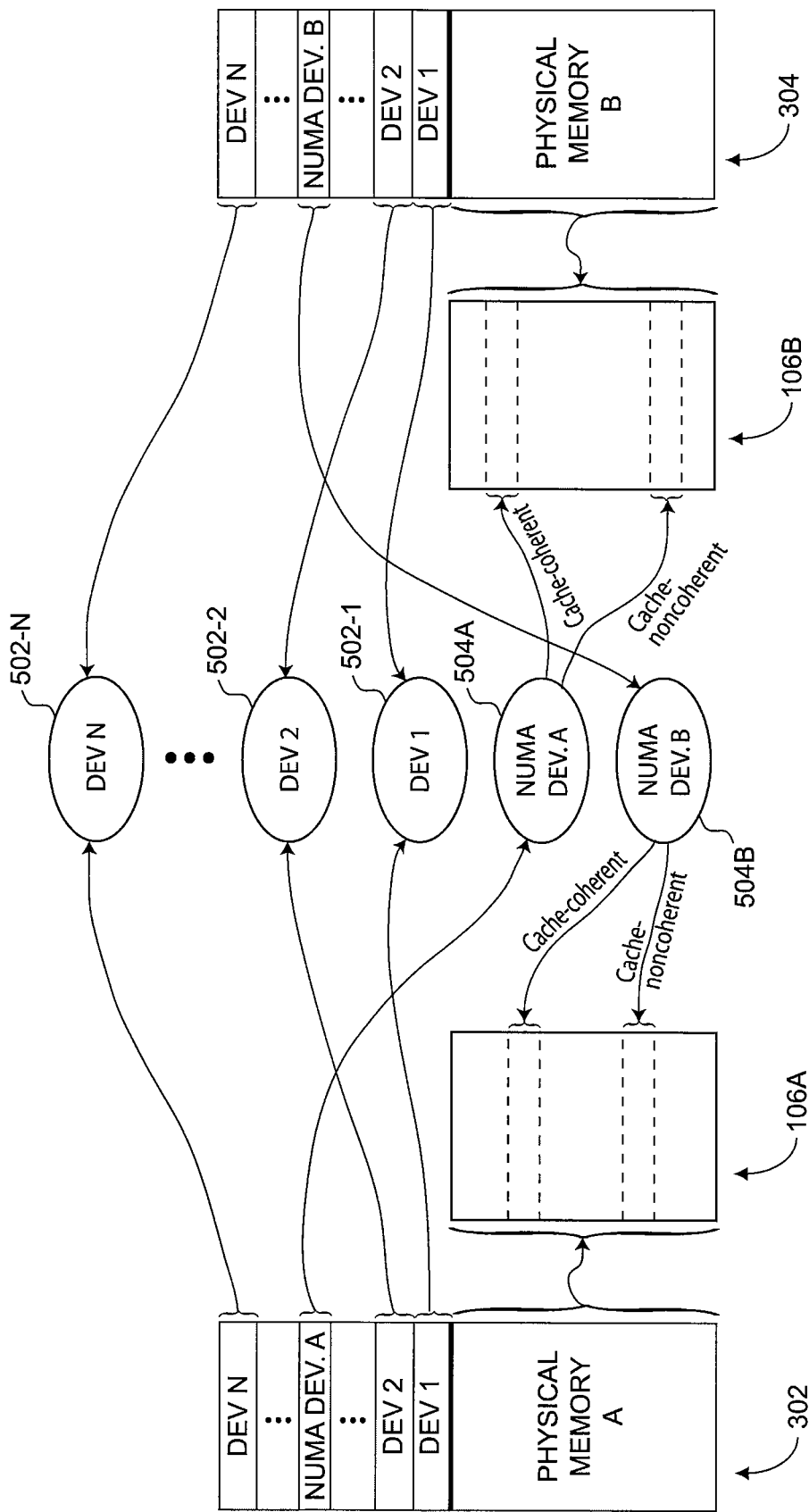
FIG. 5 is a conceptual diagram that illustrates address mapping to allow a first processor to access the physical memory associated with a second processor, according to one embodiment of the invention.

FIG. 5 is a conceptual diagram that illustrates address mapping to allow a first processor to access the physical memory associated with a second processor, according to one embodiment of the invention. A first processor is configured to generate the first address map 302, which includes MMIO apertures to hardware devices 502-1 to 502-N, NUMA device 504A, and physical memory 106A. Similarly, a second processor is configured to generate the second address map 304, which includes MMIO apertures to the hardware devices 502-1 to 502-N, NUMA device 504B, and physical memory 106B. As described herein, the NUMA devices 504A, 504B comprise hardware devices, but are referenced separately from hardware devices 502-1 to 502-N to avoid obscuring embodiments of the invention. Also, in an another embodiment, the NUMA devices 504A and 504B are combined into a single NUMA device accessed by both processors.

As shown, each address map 302, 304 includes MMIO apertures to the hardware devices 502-1 to 502-N. In alternative embodiments, a particular hardware device is not accessible by one of the processors, and, as such, an MMIO aperture to that hardware device is not included in the address map associated with that processor. In still further embodiments, the size of an aperture may be different for the same hardware device within the address maps of two different processors. Additionally, the first address map 302 and the second address map 304 illustrated in FIG. 5 may be mapped into a low address range and a high address range, respectively, in the global address map 306, as described in FIG. 3.

The first address map 302 includes an MMIO aperture that allows the first processor to access Non-Uniform Memory Access (NUMA) device 504A. NUMA device 504A provides a translation to allow access to the physical memory 106B associated with the second processor. One or more portions of the memory available to NUMA device 504A can be cache-coherent and/or cache-noncoherent, as described in greater detail below. Similarly, the second address map 304 includes an MMIO aperture that allows the second processor to access NUMA device 504B. NUMA device 504B provides a translation to allow the second processor access to the physical memory 106A associated with the first processor. Again, one or more portions of the memory available to NUMA device 504B can be cache-coherent and/or cache-noncoherent, as described in greater detail below. In various embodiments, the NUMA devices 504A, 504B are integrated hardware devices and/or peripheral hardware devices.

In order for the NUMA devices 504A and 504B to be accessible via address maps 302 and 304, respectively, the NUMA devices are enumerated by the respective processor. The I/O management module 108 may present a configuration space for the NUMA devices 504A, 504B to each processor, where the configuration space includes one or more "prefetchable" and/or "non-prefetchable" MMIO Base Address Registers (BARs). Each "prefetchable" MMIO BAR corresponds to a cache-coherent aperture and each "non-prefetchable" MMIO BAR corresponds to a cache-noncoherent aperture. The NUMA devices 504A, 504B may be configured as having class code "memory controller," or any other class code that permits one or more MMIO BARs. When enumeration software on each processor discovers the NUMA devices 504A, 504B, the enumeration software reads a maximum size supported by each of MMIO BAR using any technically-feasible enumeration mechanism. The enumeration software then allocates space in an aperture associated with the NUMA device for each MMIO BAR. Each aperture may be configured as cache-coherent or cache-noncoherent following any technically-feasible aperture generation mechanism. In addition, since NUMA support among the heterogeneous processors is provided via a hardware device (i.e., NUMA devices 504A, 504B), the hardware device may be a PCI device, and can support one or more Direct Memory Access (DMA) engines that can read/write between the two physical memories 106A, 106B.

Figure 6:
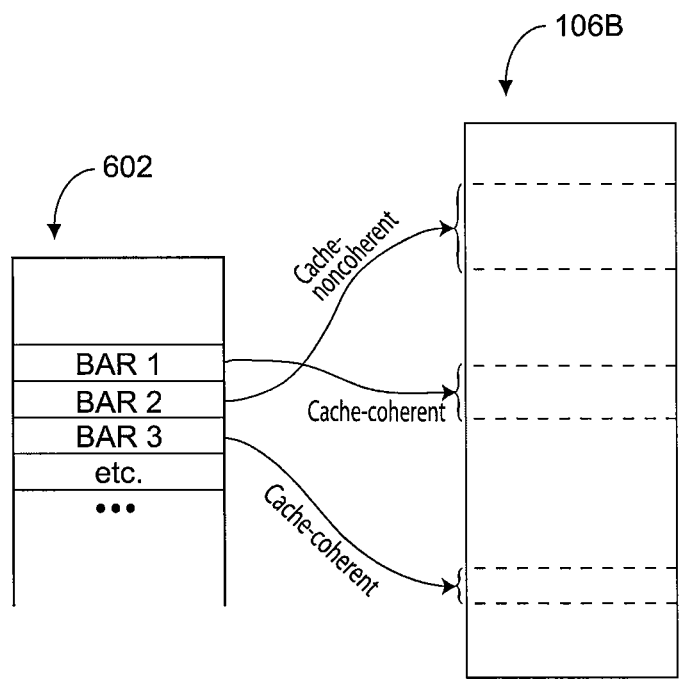
FIG. 6 is a conceptual diagram illustrating a translation table for translating Base Address Registers (BARs) associated with a first NUMA device into physical addresses associated with a physical memory, according to one embodiment of the invention.

FIG. 6 is a conceptual diagram illustrating a translation table 602 for translating Base Address Registers (BARs) associated with a first NUMA device into physical addresses associated with a physical memory 106B, according to one embodiment of the invention. As shown, the translation table 602 is configured to map a particular BAR into a particular portion of the physical memory 106B. In various embodiments, the accessible portions of the physical memory can be cache-coherent and/or cache-noncoherent. In further embodiments, the accessible portions of the physical memory 106B are not necessarily "in order" relative to the order of the BARs in the translation table 602. In still further embodiments, the size of the accessible portion of the physical memory 106B associated with a first BAR may be different than the size of the accessible portion associated with a second BAR.

Initialization of the translation table 602 is enabled by control registers located either in extended configuration space included within the NUMA device, in a separate control register BAR included within the NUMA device, or in registers included within another hardware device that controls device configuration. This initialization may be accomplished by any software during or after boot, e.g., by BIOS, by system software, by a device driver, and the like.

Figure 7:
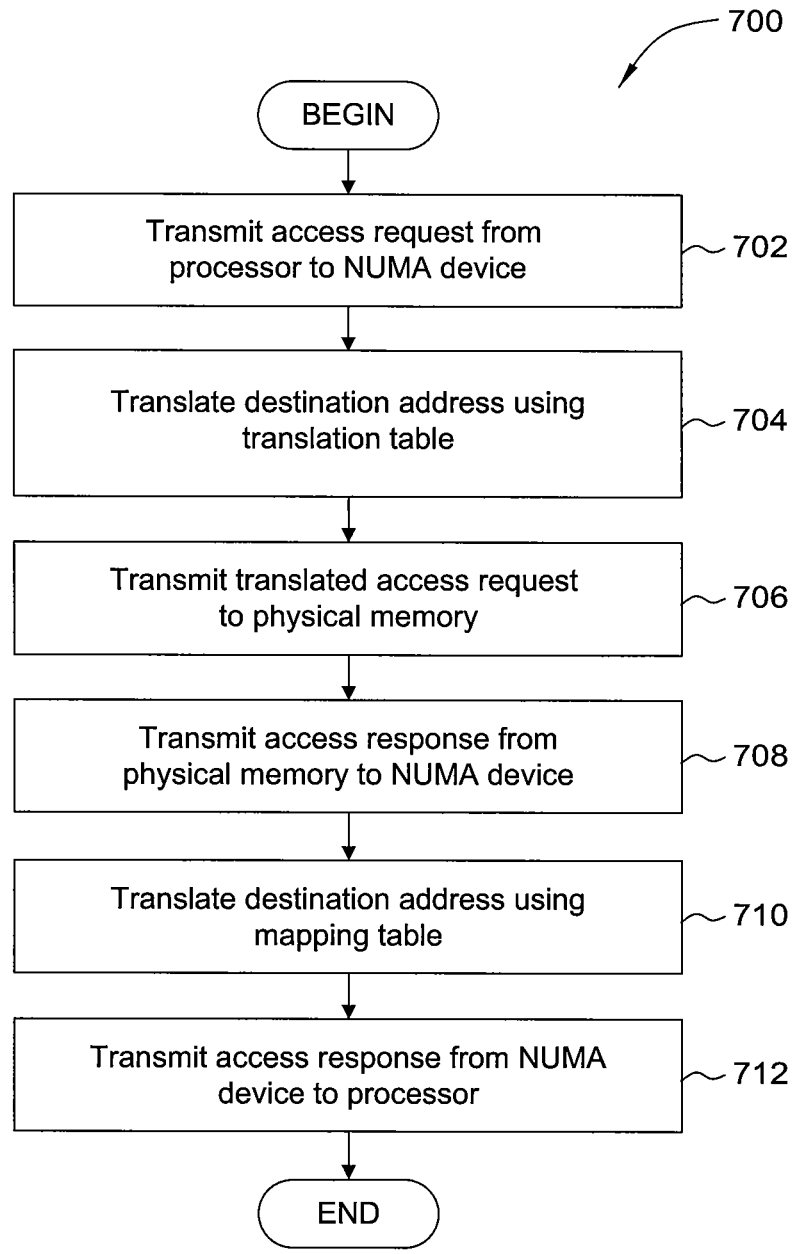
FIG. 7 is a flow diagram of method steps for allowing a first processor access a memory associated with a second processor, according to one embodiment of the invention.

FIG. 7 is a flow diagram of method steps for allowing a first processor 102A access a memory 106B associated with a second processor 102B, according to one embodiment of the invention. Persons skilled in the art will understand that, even though the method 700 is described in conjunction with the systems and methods of FIGS. 1A-6, any system configured to perform the method steps, in any order, is within the scope of the invention.

As shown, the method 700 begins at step 702, where a first processor 102A transmits an access request to a NUMA device. The access request includes an address within an MMIO aperture associated with the NUMA device. Further detail related to step 702 is described in FIG. 8.

At step 704, the NUMA device translates the destination address associated with the access request using a translation table. The translation results in a physical memory address associated with the memory 106B. Further detail related to step 704 is described in FIG. 9. At step 706, the NUMA device transmits the translated access request to the memory 106B. Transmitting/routing the translated access request is described in greater detail in FIG. 10.

At step 708, the memory controller 104B associated with the memory 106B transmits an access response to the NUMA device. Transmitting/routing the access response from the memory 106B/memory controller 104B is substantially similar to transmitting/routing a request from the processor 102B/memory controller 104B. Accordingly, further detail related to step 708 is described in FIG. 8. At step 710, the NUMA device translates the destination address associated with the access response using the translation table. In one embodiment, when the access request from the first processor 102A is "write" to the memory 106B, no access response is transmitted at step 708 and the method 700 terminates. In alternative embodiments, when the access request from the first processor 102A is "read" from the memory 106B, the access response transmitted at step 708 includes the data read from the memory 106B. In still further embodiments, when the access request from the first processor 102A is "write" to the memory 106B, the access response comprises and interrupt or some other form of confirmation that the write to the memory 106B is completed successfully.

At step 712, the NUMA device transmits the access response to the first processor based on the translation. Transmitting/routing the translated return request is described in greater detail in FIG. 10.

Figure 8:
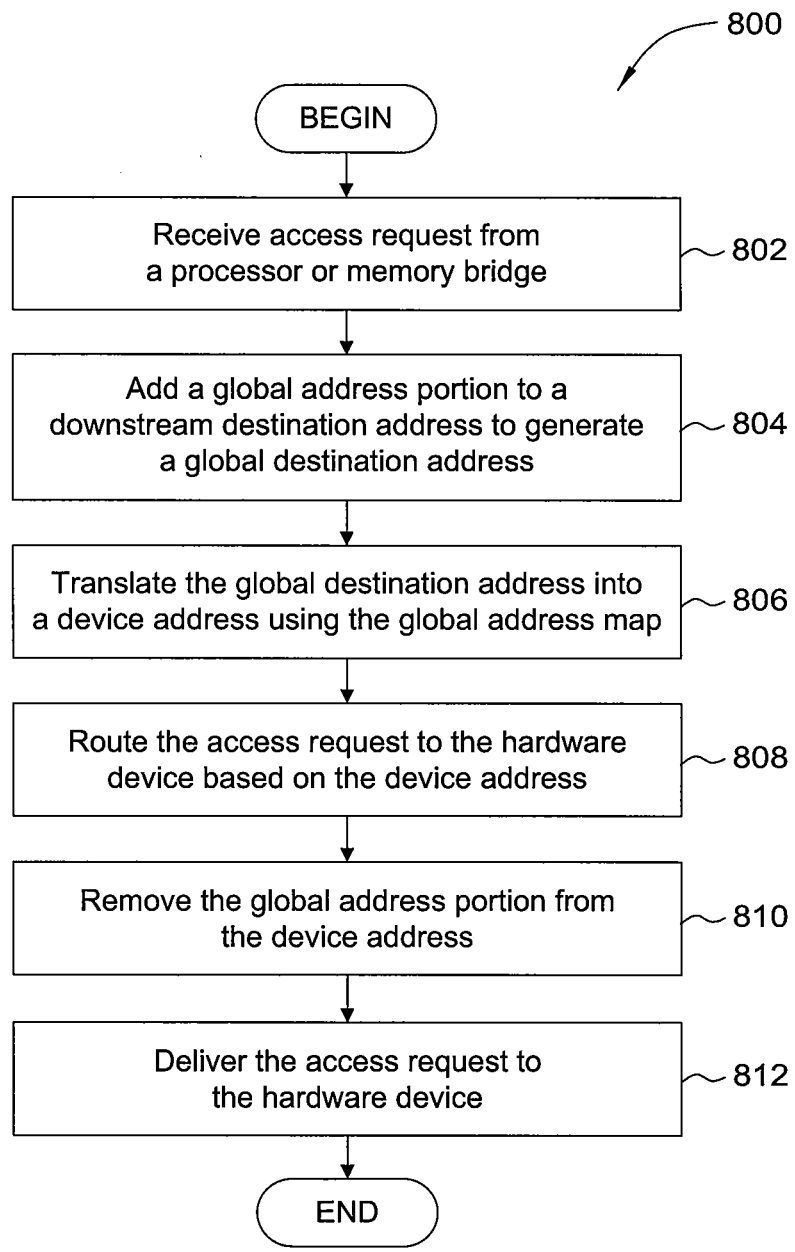
FIG. 8 is a flow diagram of method steps for routing an access request from a processor and/or memory bridge to a NUMA device, according to one embodiment of the invention.

FIG. 8 is a flow diagram of method steps for routing an access request from a processor and/or memory bridge to a NUMA device, according to one embodiment of the invention. Persons skilled in the art will understand that, even though the method 800 is described in conjunction with the systems and methods of FIGS. 1A-7, any system configured to perform the method steps, in any order, is within the scope of embodiments of the invention.

As shown, the method 800 begins at step 802, where the I/O management module 108 receives an access request from a processor or memory bridge. The processor could be, for example, one of the processors 102A, 102B. The access request could include a MMIO address or a configuration space address, as described above. In one embodiment, the access request includes an address within the MMIO aperture of the NUMA device.

At step 804, the I/O management module 108 adds a global address portion to a downstream destination address included in the access request to generate a global destination address. In one embodiment, a "0" is pre-pended to the downstream destination address if the access request is received from a first processor/memory bridge (e.g., processor 102A/memory bridge 104A); whereas, a "1" is pre-pended to the downstream destination address if the access request is received from a second processor/memory bridge 104B (e.g., processor 102B/memory bridge 104B).

At step 806, the I/O management module 108 translates the global destination address into a device address based on the global address map. In one embodiment, the device address includes the physical hardware address of the NUMA device in the computer system. At step 808, the I/O management module 108 routes the access request to the NUMA device based on the device address. At step 810, the I/O management module 108 removes the global address portion and, at step 812, delivers the access request to the NUMA device. In one embodiment, the processor is not aware that there are multiple processors in the computer system that can access the NUMA device and/or the memories 106A, 106B. The global address portion, e.g., the pre-pended bit, is removed from the address portion of the access request since the hardware device (e.g., the NUMA device) expects an address having the same number of bits as the original downstream destination address included in the access request when the access request was received by the I/O management module.

Figure 9:
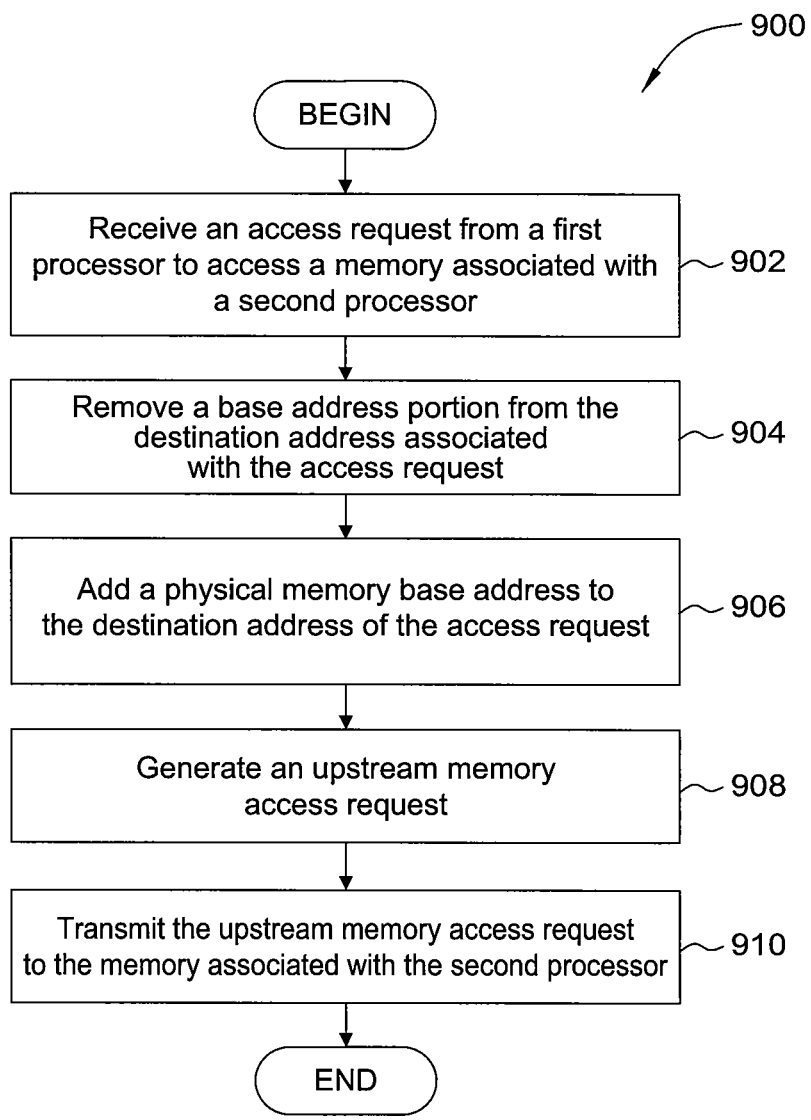
FIG. 9 is a flow diagram of method steps for translating an access request received from the first processor into an upstream memory access request to access a memory associated with the second processor, according to one embodiment of the invention.

FIG. 9 is a flow diagram of method steps for translating an access request received from the processor 102A into an upstream memory access request to access a memory 106B associated with a second processor 102B, according to one embodiment of the invention. Persons skilled in the art will understand that, even though the method 900 is described in conjunction with the systems and methods of FIGS. 1A-8, any system configured to perform the method steps, in any order, is within the scope of embodiments of the invention.

As shown, the method 900 begins at step 902, where the NUMA device receives the access request from the processor 102A. The access request is configured to provide access to the memory 106B associated with the processor 102B. As described in FIG. 5, the access request may include a destination address associated with the NUMA device, e.g., NUMA device 504A. In one embodiment, the access request is routed from the first processor to the NUMA device based on the steps of the method 800, described in FIG. 8.

At step 904, the NUMA device removes a base address portion from the destination address associated with the access request. In one embodiment, removing the base address portion includes "zeroing out" a first portion of the destination address.

At step 906, the NUMA device adds a physical memory base address to the destination address associated with the access request. As described in FIG. 6, one or more BARs included in the translation table 602 associated with the NUMA device map to portions of the physical memory 106B. In one embodiment, steps 904 and 906 describe a technique for performing this mapping.

At step 908, the NUMA device generates an upstream access request, and at step 910, the NUMA device transmits the upstream memory access request to the physical memory associated with the second processor. The upstream memory access request is either a cache-coherent memory transaction or a cache-noncoherent memory transaction, depending on the configuration of the particular BAR in the translation table associated with the memory address. The memory bridge 104B associated with the second processor receives the upstream memory access request and processes the request. If the request is cache-noncoherent, memory bridge 104B issues the request to the memory controller directly. If the request is a read transaction, memory bridge 104B also returns read response data. If the request is a cache-coherent read, memory bridge 104B ensures first that a cache associated with the second processor is coherent with memory 106B before reading and retuning read response data. If the request is a cache-coherent write, memory bridge 104B ensures first that the cache associated with the second processor is coherent with the memory 106B before combining the write request with data that may already be in the cache associated with the second processor, and then writes the result to physical memory. Thus, the first processor 102A achieves either cache-coherent or cache-noncoherent memory access to physical memory 106B associated with the second processor 102B. Importantly, embodiments of the invention ensure coherency between access requests originating from the NUMA device and the CPU cache/memory, without relying on any specific CPU or memory controller mechanism.

Figure 10:
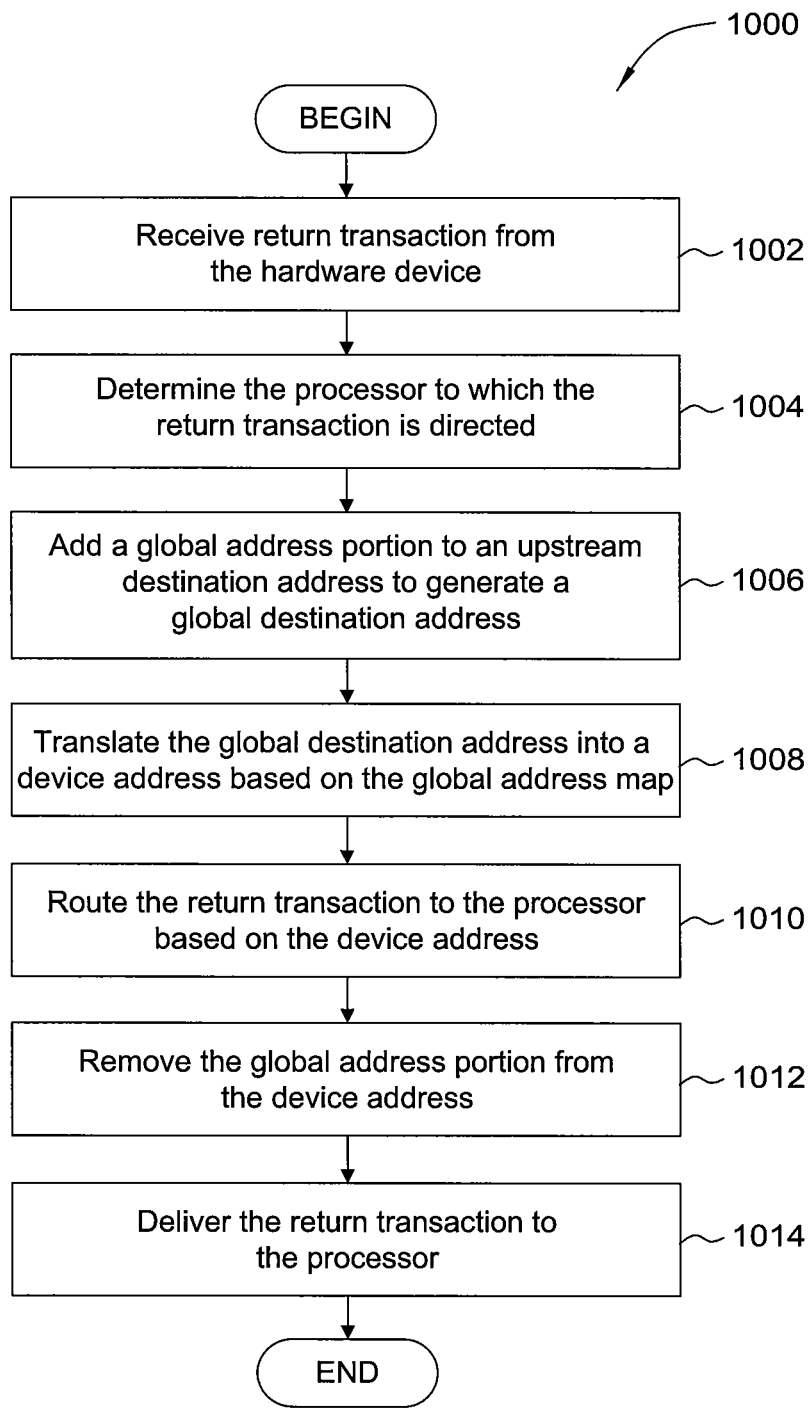
FIG. 10 is a flow diagram of method steps for routing an upstream transaction from the NUMA device to a processor or to a physical memory, according to one embodiment of the invention.

FIG. 10 is a flow diagram of method steps for routing an upstream transaction from the NUMA device to a processor or to a physical memory, according to one embodiment of the invention. Persons skilled in the art will understand that, even though the method 1000 is described in conjunction with the systems and methods of FIGS. 1A-9, any system configured to perform the method steps, in any order, is within the scope of embodiments of the invention.

As shown, the method 1000 begins at step 1002, where the I/O management module 108 receives a return transaction from the NUMA device. The return transaction is also referred to herein as an "upstream transaction." In various embodiments, the return transaction comprises (a) an upstream device completion that results from a previous downstream non-posted request (e.g., read return data) (b) transaction involving reads from and/or writes to system memory for device controller direct memory access (DMA), (c) upstream messages (e.g., interrupts), and (d) peer-to-peer transactions between two hardware devices. Peer-to-peer transactions, according to embodiments of the invention, are handled differently by the I/O management module 108 relative to the other three types of upstream transactions. As such, processing peer-to-peer transactions is outside the scope of the method 1000 described in FIG. 10, and is discussed further below.

At step 1004, the I/O management module 108 determines the processor to which the return transaction is directed. In one embodiment, the NUMA device from which the return transaction is received is unique to each processor, thus, the I/O management module 108 can determine to which processor the return transaction is directed based on which NUMA device issues the return transaction. In alternative embodiments, when a downstream transaction is processed by the I/O management module 108 (i.e., as described in FIG. 8), the last processor to issue an access request to the NUMA device may be marked as the "owner" of the NUMA device. In this embodiment, the I/O management module 108 may check the ownership information and determine that the return transaction is directed towards the owner of the hardware device. In still further embodiments, the I/O management module determines to which processor the return transaction is directed in any other technically feasible way.

At step 1006, I/O management module 108 adds a global address portion to an upstream destination address to generate a global destination address. The global address portion that is added depends on which processor the upstream transaction is directed towards. In one embodiment, adding the global address portion comprises pre-pending a bit to the upstream destination address based on which processor is the owner of the hardware device.

At step 1008, the I/O management module 108 translates the global destination address into a device address based on the global address map, and at step 1010, the I/O management module 108 routes the upstream transaction to the appropriate processor or memory bridge based on the global address. In one embodiment, steps 1008 and 1010 are substantially similar to steps 806 and 808, respectively, as described previously herein.

At step 1012, the I/O management module 108 removes the global address portion from the device address, and at step 1014, the I/O management module 108 delivers the upstream transaction to the processor and/or memory bridge. In one embodiment, steps 1012 and 1014 are substantially similar to steps 810 and 812, respectively, as described previously herein.

In alternative embodiments, the I/O management module 108 can also route peer-to-peer transactions between two hardware devices. For example, the processor initiates the peer-to-peer transaction by issuing an access request to a first hardware device (e.g., hardware device A), which in turn issues an upstream transaction directed towards a second hardware device (e.g., hardware device B). In one embodiment, the processor that issued the original access request is set as the owner of both hardware devices. Accordingly, no additional modifications are required to support the peer-to-peer transaction since the destination address of the upstream transaction (i.e., the destination address of hardware device B) is the same in the local address maps of both hardware devices. In another embodiment, the computer system can be configured by BIOS or I/O management module system software to allocate peer-to-peer apertures at the same offsets in all processor address maps so that device "ownership" is immaterial. In this manner, peer-to-peer transaction routing "just works" since the destination addresses of all upstream peer-to-peer transaction for each hardware device are the same, no matter which processor initiated the peer-to-peer transaction.

Advantageously, heterogeneous CPUs included in multi-CPU system can access any memory included within the computer system, without modifying the CPU, the operating system, or the memory controllers. As such, embodiments of the invention allow for more complex and interesting computing systems to be assembled. Additionally, the two CPUs can be heterogeneous and/or made by different vendors, which allows for even more interesting multi-CPU computer systems to be assembled.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A method for providing a first processor access to a physical memory associated with a second processor included in a computer system, the method comprising:
   receiving a first address map from the first processor that includes a memory-mapped input/output (I/O) aperture for a non-uniform memory access (NUMA) device that the first processor is configured to access, wherein the NUMA device comprises an enumerated hardware device coupled to an input/output (I/O) controller, and wherein the memory-mapped I/O aperture provides the first processor memory-mapped I/O access to the NUMA device;
   receiving a second address map from the second processor that includes memory-mapped I/O apertures for a set of hardware devices that the second processor is configured to access;
   generating a global address map by combining the first address map and the second address map;
   receiving a first access request transmitted from the first processor to the NUMA device, whereby the first processor requests access to the physical memory associated with the second processor;
   generating a memory access request based on the first access request and based on a translation table for translating memory mapped I/O addresses into physical addresses associated with a physical memory, wherein the translation table maps a first address associated with the first access request into a second address associated with the physical memory associated with the second processor; and
   routing the memory access request to the physical memory based on the global address map to cause a memory bridge associated with the second processor to:
   determine that the first access request is a cache-coherent access request;
   determine that a cache associated with the second processor is coherent with the physical memory associated with the second processor; and
   in response to determining that the cache is coherent, access data in the physical memory associated with the second processor based on the memory access request.

2. The method of claim 1, further comprising the steps of:
   receiving an access response from the physical memory, wherein the access response is responsive to the memory access request; and
   generating a return request based on data associated with the access response, wherein the return request is responsive to the first access request.

3. The method of claim 1, further comprising the steps of:
   generating a first global destination address by adding a first global address portion to a first destination address associated with the first access request;
   translating the first global destination address into a NUMA device address based on the global address map;
   removing the global address portion from the translated destination address; and
   delivering the first access request to the NUMA device.

4. The method of claim 3, wherein the step of adding the first global address portion comprises prepending a bit to the first destination address included in the first access request.

5. The method of claim 3, further comprising the steps of:
   receiving a return request from the NUMA device;
   determining that the return request is directed towards the first processor;
   generating a second global destination address by adding a second global address portion to a second destination address associated with the return request;
   translating the second global destination address into a second device address using the global address map;
   routing the return request to the first processor based on an address mapping included in the global address map;

removing the second global address portion from the translated destination address; and delivering the return request to the first processor.

6. The method of claim 2, wherein the return request comprises an interrupt or a device completion message.

7. The method of claim 1, wherein the first processor and second processor are configured to execute different instruction sets and different operating systems.

8. The method of claim 1, wherein the translation table includes one or more Base Address Registers (BARs) that each maps to a different portion of the physical memory associated with the second processor.

9. The method of claim 1, wherein a first portion of the physical memory is cache-coherent and a second portion of the physical memory is non-cache-coherent.

10. The method of claim 1, wherein the NUMA device has an enumeration class code associated with a memory controller class type.

11. A non-transitory computer-readable medium storing instructions that, when executed by a processor, cause a computer system to provide a first processor access to a physical memory associated with a second processor included in the computer system, by performing the steps of:

receiving a first address map from the first processor that includes a memory-mapped input/output (I/O) aperture for a non-uniform memory access (NUMA) device that the first processor is configured to access, wherein the NUMA device comprises an enumerated hardware device coupled to an input/output (I/O) controller, and wherein the memory-mapped I/O aperture provides the first processor memory-mapped I/O access to the NUMA device;

receiving a second address map from the second processor that includes memory-mapped I/O apertures for a set of hardware devices that the second processor is configured to access;

generating a global address map by combining the first address map and the second address map;

receiving a first access request transmitted from the first processor to the NUMA device, whereby the first processor requests access to the physical memory associated with the second processor;

generating a memory access request based on the first access request and based on a translation table for translating memory mapped I/O addresses into physical addresses associated with a physical memory, wherein the translation table maps a first address associated with the first access request into a second address associated with the physical memory associated with the second processor; and routing the memory access request to the physical memory based on the global address map to cause a memory bridge associated with the second processor to:
determine that the first access request is a cache-coherent access request;
determine that a cache associated with the second processor is coherent with the physical memory associated with the second processor; and
in response to determining that the cache is coherent, access data in the physical memory associated with the second processor based on the memory access request.

12. The computer-readable medium of claim 11, wherein the translation table includes one or more Base Address Registers (BARs) that each maps to a different portion of the physical memory associated with the second processor.

13. The computer-readable medium of claim 11, wherein the NUMA device has an enumeration class code associated with a memory controller class type.

14. A system for providing a first processor access to a physical memory associated with a second processor included in a computer system, the device controller comprising:

a non-uniform memory access (NUMA) device configured to generate a memory access request based on a first access request received from the first processor and based on a translation table for translating memory mapped input/output (I/O) addresses into physical addresses associated with the physical memory associated with the second processor, wherein the translation table maps a first address associated with the first access request into a second address associated with the physical memory associated with the second processor; and an input/output (I/O) controller configured to:
receive a first address map from the first processor that includes a memory-mapped I/O aperture for the NUMA device that the first processor is configured to access, wherein the NUMA device is an enumerated hardware device coupled to the I/O controller;
receive a second address map from the second processor that includes memory-mapped I/O apertures for a set of hardware devices that the second processor is configured to access;
generate a global address map by combining the first address map and the second address map;
receive the first access request transmitted from the first processor to the NUMA device, whereby the first processor requests access to the physical memory associated with the second processor;
route the memory access request to the physical memory based on the global address map to cause a memory bridge associated with the second processor to:
determine that the first access request is a cache-coherent access request;
determine that a cache associated with the second processor is coherent with the physical memory associated with the second processor; and
in response to determining that the cache is coherent, access data in the physical memory associated with the second processor based on the memory access request.

15. The system of claim 14, wherein the I/O controller is further configured to:
receive an access response from the physical memory, wherein the access response is responsive to the memory access request; and
generate a return request based on data associated with the access response, wherein the return request is responsive to the first access request.

16. The system of claim 15, wherein the return request comprises an interrupt or a device completion message.

17. The system of claim 14, wherein the I/O controller is further configured to:
generate a first global destination address by adding a first global address portion to a first destination address associated with the first access request;
translate the first global destination address into a NUMA device address based on the global address map;
remove the global address portion from the translated destination address; and
deliver the first access request to the NUMA device.

18. The system of claim 14, wherein the translation table includes one or more Base Address Registers (BARs) that each maps to a different portion of the physical memory associated with the second processor.

19. The system of claim 14, wherein a first portion of the physical memory is cache-coherent and a second portion of the physical memory is non-cache-coherent.

20. The system of claim 14, wherein the NUMA device has an enumeration class code associated with a memory controller class type.

* * * * *